United States Patent
Persson

(10) Patent No.: US 9,656,774 B2
(45) Date of Patent: May 23, 2017

(54) SUSPENSION FOR A SEALING JAW AND METHOD FOR CALIBRATING SEALING JAWS

(75) Inventor: Richard Persson, Häljarp (SE)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 675 days.

(21) Appl. No.: 14/115,848

(22) PCT Filed: Jun. 13, 2012

(86) PCT No.: PCT/SE2012/050637
§ 371 (c)(1),
(2), (4) Date: Nov. 5, 2013

(87) PCT Pub. No.: WO2012/173558
PCT Pub. Date: Dec. 20, 2012

(65) Prior Publication Data
US 2014/0069055 A1    Mar. 13, 2014

(30) Foreign Application Priority Data

Jun. 15, 2011 (SE) ...................................... 1150540

(51) Int. Cl.
*B65B 51/30* (2006.01)
*B29C 65/00* (2006.01)
(Continued)

(52) U.S. Cl.
CPC .......... *B65B 51/30* (2013.01); *B29C 65/3656* (2013.01); *B29C 66/1122* (2013.01);
(Continued)

(58) Field of Classification Search
CPC ............ B29C 65/3668; B29C 66/9241; B29C 66/849; B29C 66/8226; B29C 66/8221;
(Continued)

(56) References Cited

U.S. PATENT DOCUMENTS 4,068,449 A * 1/1978 Harper .................. B65B 7/2842
53/319
4,199,316 A * 4/1980 Bradbury .......... B29C 45/14073
425/128

(Continued)

FOREIGN PATENT DOCUMENTS

DE    3 028 968 A1    2/1982
EP    1 362 790 A1    11/2003
(Continued)

OTHER PUBLICATIONS

International Search Report (PCT/ISA/210) mailed on Sep. 10, 2012, by the Swedish Patent Office as the International Searching Authority for International Application No. PCT/SE2012/050637.

*Primary Examiner* — Michelle Lopez
*Assistant Examiner* — Chinyere Rushing-Tucker
(74) *Attorney, Agent, or Firm* — Buchanan Ingersoll & Rooney PC

(57) ABSTRACT

A sealing jaw assembly for a sealing unit, and in particular an arrangement for suspending a sealing jaw in a socket is disclosed. The arrangement is based on a first and a second spring arrangement wherein the action of the first spring arrangement onto the sealing jaw may be activated and deactivated.

17 Claims, 3 Drawing Sheets

(51) Int. Cl.
*B29C 65/36* (2006.01)
*B65B 51/14* (2006.01)

(52) U.S. Cl.
CPC .... *B29C 66/43121* (2013.01); *B29C 66/7234* (2013.01); *B29C 66/8161* (2013.01); *B29C 66/8167* (2013.01); *B29C 66/8221* (2013.01); *B29C 66/8226* (2013.01); *B29C 66/8322* (2013.01); *B29C 66/83241* (2013.01); *B29C 66/849* (2013.01); *B29C 66/9241* (2013.01); *B65B 51/14* (2013.01); *B65B 51/303* (2013.01); *B29C 65/3668* (2013.01); *B29C 66/81427* (2013.01); *B29C 66/81457* (2013.01); *B29C 66/92653* (2013.01); *B29C 66/92655* (2013.01); *B31B 2201/603* (2013.01); *Y10T 29/49721* (2015.01)

(58) Field of Classification Search
CPC .......... B29C 66/83241; B29C 66/8167; B29C 66/8161; B29C 66/43121; B29C 66/1122; B29C 66/8322; B29C 66/7234; B29C 65/36; B65B 51/303; B65B 51/14; B65B 51/30; B31B 2201/603
USPC ................. 188/166; 53/373.7; 29/402.03
See application file for complete search history.

(56) References Cited

U.S. PATENT DOCUMENTS

| | | | | |
|---|---|---|---|---|
| 4,630,429 A | * | 12/1986 | Christine | B29C 65/18 156/515 |
| 4,753,629 A | * | 6/1988 | Powell | B29C 65/18 493/225 |
| 4,755,117 A | * | 7/1988 | Onnenberg | B29C 44/146 425/112 |
| 5,131,213 A | * | 7/1992 | Shanklin | B29C 65/18 53/373.7 |
| 5,328,545 A | * | 7/1994 | Kaminski | B29C 65/20 100/171 |
| 5,771,660 A | | 6/1998 | Loewenthal | |
| 7,174,699 B1 | * | 2/2007 | Wyman | B29C 65/743 53/374.8 |
| 2003/0213217 A1 | | 11/2003 | Kondo et al. | |
| 2004/0139701 A1 | * | 7/2004 | Cady | B29C 65/18 53/434 |
| 2004/0265151 A1 | * | 12/2004 | Bertram | B29B 7/7678 417/420 |
| 2008/0142165 A1 | * | 6/2008 | Naoki | B29C 65/18 156/583.9 |
| 2009/0266030 A1 | * | 10/2009 | Mancin | B29C 65/08 53/373.7 |
| 2014/0083050 A1 | * | 3/2014 | Persson | B29C 66/1122 53/373.7 |

FOREIGN PATENT DOCUMENTS

| | | |
|---|---|---|
| EP | 1 911 567 A1 | 4/2008 |
| EP | 2 113 370 A1 | 11/2009 |
| EP | 2 311 738 A1 | 4/2011 |
| GB | 1 426 626 A | 3/1976 |
| WO | WO 2005/118404 A | 12/2005 |

\* cited by examiner

SUSPENSION FOR A SEALING JAW AND METHOD FOR CALIBRATING SEALING JAWS

TECHNICAL FIELD

The present invention relates to a suspension for a clamping jaw, in particular to a sealing jaw used in a sealing unit for forming and sealing an open end of a tubular packaging container.

BACKGROUND

Within the field of packaging of pourable products, and in particular of pourable foods, there are various kinds of packaging containers used. The packaging containers vary in package shape, packaging material, etc. resulting in variation in the method used for filling of the packaging container and sealing of the packaging container. The present invention may preferably be used for a packaging container made from a packaging laminate comprising a core layer and several surrounding barrier layers.

When sealing an end of a tubular packaging container use is often made of sealing jaws, clamping and heating the end of the packaging container in order to seal one end thereof. The basic technique is well-known and will not be discussed in any more detail here. For the purposes of the present invention, however it should be mentioned that "tubular" includes packages having a cross section other than circular, such as quadratic, rectangular, hexagonal, oval, etc, i.e. a packaging container being formed by bonding two opposite edges thereof to form a sleeve.

The sealing of an end of a packaging container is a complex procedure. The end should be sealed, formed and folded according to a preset pattern, and fixed to the desired shape (usually flat in the case of the bottom of a container). The different operations are not necessarily performed in the order stated above; when sealing the final open end of a container, the sealing should preferably be performed late, since a surplus of air will be caught inside the container if sealed too early. This poses no problem when the first end of the container is sealed, formed and folded.

The stated operations are not necessarily performed by the same tool, either. Generally, the sealing and initial forming and folding are performed by one tool, and the final folding and fixing is accomplished by another tool, or arrangement of tools.

The tool for sealing and initial forming and folding may comprise two opposing sealing jaws, clamping the open end of the tubular packaging container and providing energy for the accomplishment of sealing. On their way from an open position to a clamping position the two opposing sealing jaws may follow a path of movement such that they initiate the forming and folding, and after clamping and sealing the packaging container, they may continue their movement to continue the forming and folding. Even if the path as such may be simple enough, the mechanics needed in order to make the sealing jaws follow such path will be more complex, in particular since factors such as reliability, repeatability, and durability are important and since price is always an issue. Examples of prior art solutions may be found in WO2004054790, by the present applicant, and US2008/0276576 also by the present applicant. Further, there is great effort put into the accomplishment of adequate sealing force at the time of clamping the packaging material between the sealing jaws. The present invention aims at providing a sealing jaw suspension which among other things facilitates the accomplishment of such adequate sealing force/clamping force.

SUMMARY

For achieving the above purposes a suspension according to the present invention may be defined as a sealing unit having a suspension configured to suspend a sealing jaw in a socket, the suspension comprising a first spring arrangement and a second spring arrangement for selectively biasing the sealing jaw in a sealing direction, i.e. in the direction of an opposing sealing jaw, wherein in that the first spring arrangement has a state in which it is rigidly attached to the socket and a state in which it is movably attached to the socket.

This may also be worded as the sealing unit comprising a sealing jaw suspended in a socket via a suspension comprising a first spring arrangement and a second spring arrangement for biasing the sealing jaw in a sealing direction, wherein the suspension has a first state in which the first spring arrangement is rigidly attached to the socket and operable to apply a biasing force onto the sealing jaw in the sealing direction while the second spring arrangement is prevented from applying a biasing force onto the sealing jaw, and
 a second state in which the first spring arrangement is movably arranged to the socket and the second spring arrangement is arranged to apply a biasing force onto the sealing jaw, also in the sealing direction.

The ability to engage and disengage the first spring arrangement enables isolation of the second spring arrangement during calibration of the sealing jaws, i.e. in the procedure during which the distance between opposing sealing jaws is set. This distance, the spring constants and the thickness of the packaging material are parameters that determine the force applied onto the packaging material during forming and sealing (the sealing pressure).

In one or more embodiments the second spring arrangement is configured to selectively apply a biasing force onto the sealing jaw, which makes it possible to activate the action of the second spring arrangement during calibration only. In this way the sealing pressure will be perfectly predictable.

The first spring arrangement of the suspension may comprise a first housing in which a first spring is arranged, the housing having an open end in the direction of the sealing jaw. The use of a housing enables simple confinement of the first spring and makes it readily attachable to a socket or shoe. In one or several embodiments the second spring arrangement may be configured to act directly onto the sealing jaw, and in other embodiments it may be configured to act on the housing of the first spring arrangement and thus indirectly onto the sealing jaw. The latter embodiment vouches for a space efficient and slender construction, while the former is a more straightforward construction in which the function of the first and the second spring arrangement is separated.

In order to increase the performance of the suspension a resilient buffer may be arranged between the first spring and the sealing jaw, the resilient buffer having a through hole in the biasing direction. The resilient buffer, embodiments of which will be described in the detailed description, will make the suspension less susceptible for damage since it may absorb unexpected behaviour of the sealing jaw.

The housing of the first spring arrangement may be arranged in a matching opening of the socket/shoe, and in other embodiments a housing of the second spring arrangement may be arranged in a matching opening of the shoe/socket too, which makes is ease to accomplish engagement/disengagement. The show/socket may comprise two halves such that clamping of the first spring arrangement in its opening is readily accomplished, as will be clarified in the detailed description.

In any embodiment of the present invention an effective spring constant for the first spring arrangement may exceeds an effective spring constant for the second spring arrangement.

In general terms, and describing common features of various embodiments of the invention, a method for calibrating the distance between opposing sealing jaws then may comprise the following steps, which do not necessarily have to be conducted in the stated order:

Bringing the opposing sealing jaws to a fully closed position,

Disengaging the first spring arrangement such that the sealing jaws are biased towards each other by means of a force provided by a second spring arrangement only, Engaging the first spring arrangement.

The disengagement/engagement of the first spring arrangement may preferably be effected by disengaging/engaging its coupling to the socket.

This method may also comprise the steps of engaging and disengaging the second spring arrangement, wherein the step of disengaging the second spring arrangement is effected after the step of engaging the first spring arrangement. "Engaging" the second spring arrangement implies that the second spring arrangement effectively acts on the first sealing jaw to force the sealing jaws towards each other and "disengaging" implies that it does not. These additional steps may be conducted in a situation where the second spring arrangement should be prevented from interacting during the actual working cycle of the forming/sealing unit utilizing the floating dolly.

The method may also comprise, with or without the above mentioned additional steps, the step of arranging a shim element between the sealing jaws. The shim element may comprise a piece of sheet material with the desired thickness such as a piece of sheet metal or a piece of folded or non-folded packaging material. The desired thickness may preferably be smaller than the thickness of the material being arranged between the sealing jaws during actual operation.

The floating dolly system may be utilized on the form and sealing unit according to any embodiment previously described, yet it may also be used as standalone construction which may be applied to a sealing and/or forming unit utilizing sealing jaws in general.

Although the present invention has been described above with reference to specific embodiments, it is not intended to be limited to the specific form set forth herein. Rather, the invention is limited only by the accompanying claims and, other embodiments than the specific above are equally possible within the scope of these appended claims.

In the claims, the term "comprises/comprising" does not exclude the presence of other elements or steps. Furthermore, although individually listed, a plurality of means, elements or method steps may be implemented by e.g. a single unit or processor. Additionally, although individual features may be included in different claims, these may possibly advantageously be combined, and the inclusion in different claims does not imply that a combination of features is not feasible and/or advantageous. In addition, singular references do not exclude a plurality. The terms "a", "an", "first", "second" etc do not preclude a plurality. Reference signs in the claims are provided merely as a clarifying example and shall not be construed as limiting the scope of the claims in any way.

DETAILED DESCRIPTION

Figure 1:
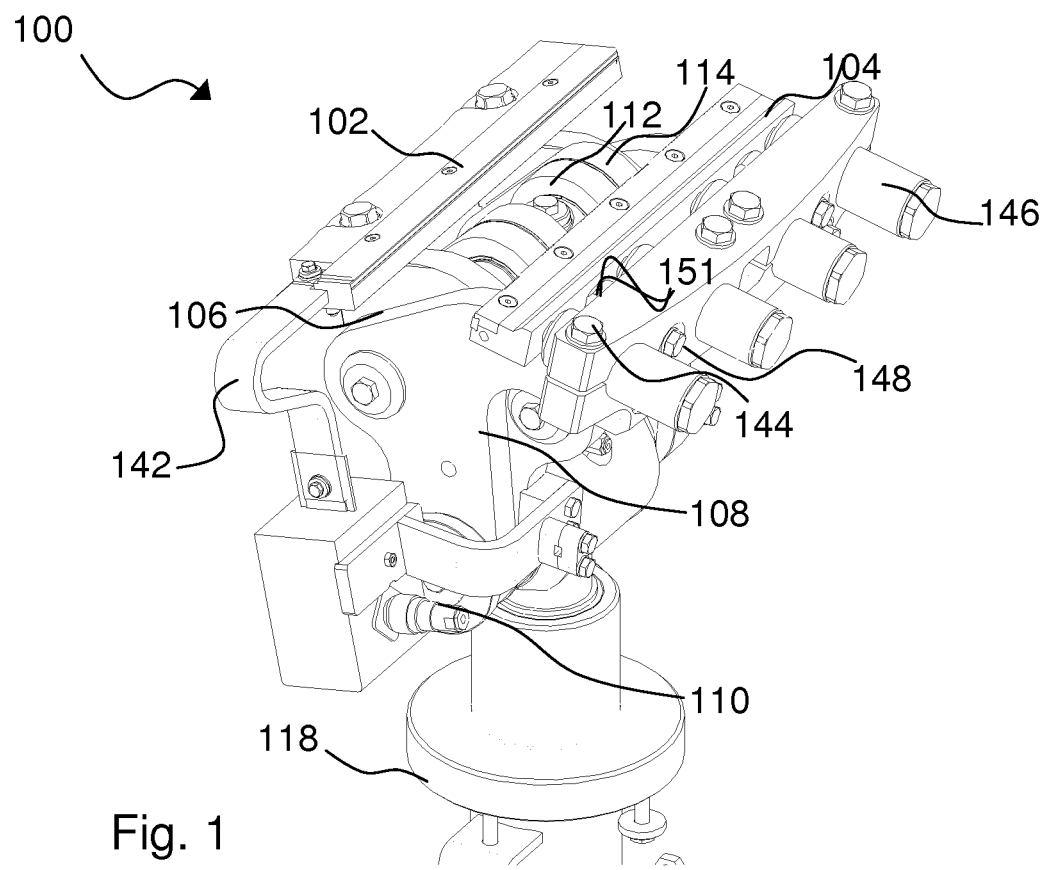
FIG. 1 is a perspective view of a form and sealing unit comprising a suspension according to a first embodiment of the present invention.

In order to put the present invention into context reference is first made to FIG. 1, illustrating a form and sealing unit 100 having a suspension arrangement according to a first embodiment of the present invention. Starting from the top, the function of the form and sealing unit 100 is to move the sealing jaws 102, 104 between an open and a closed position. The open position allows for a new package container to be inserted between the sealing jaws and the closed position allows for one end of a package container to be closed and sealed. The purpose and function of the sealing jaws will not be discussed in detail here, since the purpose is obvious and the basic function may be considered well known for the skilled person. The path chosen by the sealing jaws on their way from the open to the closed position will affect their interaction with the package container, and the path is a parameter to account for. This will be discussed later on in the detailed description.

Moving on, each sealing jaw 102, 104 is attached to a proximal end of a corresponding tong 106, 108. At least one of the sealing jaws 104 is movably attached to the corresponding tong 108, such that the distance between the sealing jaws 102, 104 may be varied. The main purpose for wanting to vary the distance between sealing jaws is to account for specific thickness of the packaging material by adjusting the clearance between the sealing jaws. The opposing, distal end of each tong 106, 108 is coupled to a first pivot axis 110, which in the present embodiment is a common pivot axis for both tongs 106, 108.

Figure 2:
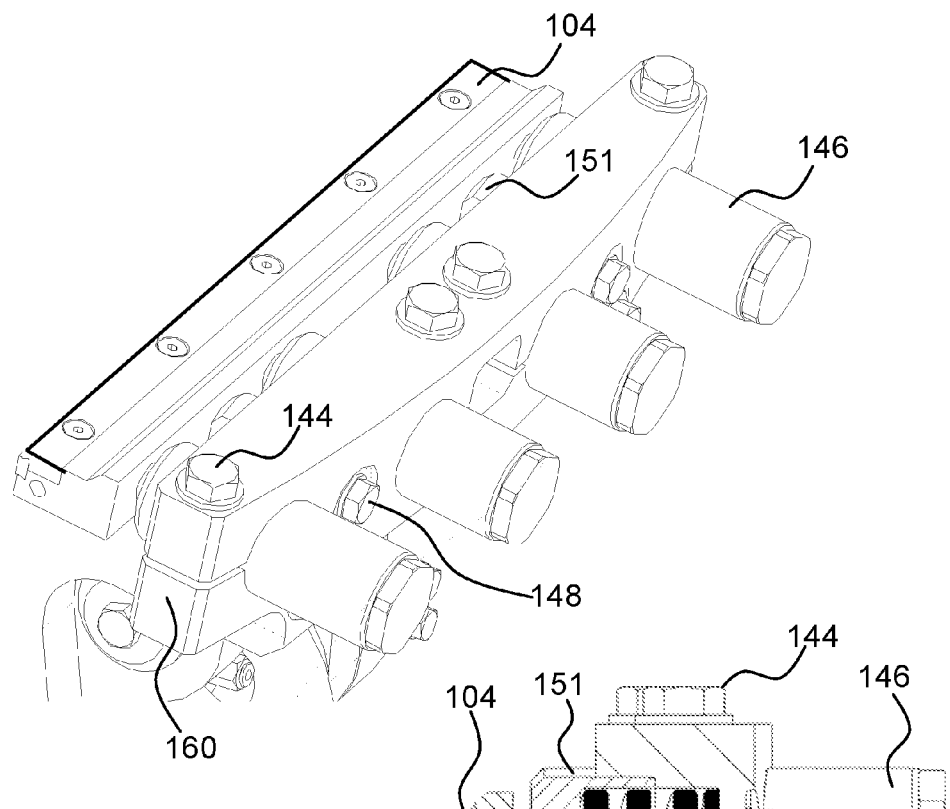
FIG. 2 is a detailed view in perspective of the form and sealing unit of FIG. 1.

Details of the sealing jaw 104 are more readily appreciated studying FIG. 2.

In a position between the sealing jaws 102, 104 and the first pivot axis 110 links 112, 114 (partly obscured in FIG. 1) extend from the tongs 106, 108 to a common second pivot axis 116 (not shown in FIG. 1). The links 112, 114 are allowed to pivot at both their attachment points, and in the present embodiment each tong is associated with two links. It is readily understood that by altering the relative distance between the first and the second pivot axis, the inclination of each link will vary, and by that the distance between the sealing jaws 102, 104. The device is preferably tuned such that the position in which the links are directed 180° degrees relative to each other is included in an operational cycle, corresponding to the position in which the sealing jaws are fully closed (or at least cannot be brought any closer to each other).

A socket 118 acts as the framework for the unit 100, and components being rigidly connected to the socket will form a part of the framework. It should be obvious for the skilled person reading this description that all forces generated by the system will be absorbed inside the system too, since the socket 118 will act as a rigid anchor. If the system operates in such a way that inertial forces become an issue it will have to be balanced properly. What has been described above is located on one side of the socket 118. The other side of the socket 118 comprises the drive section, details of which is not relevant for the present invention.

Returning to the sealing jaws 102, 104 and in particular their suspension the reader may benefit from knowing that in the present embodiment the tongs 106, 108 are essentially identical and two tongs are used for each sealing jaw. One of the sealing jaws 102 comprises an inductor, which is used to heat the packaging material clamped between the first sealing jaw 102 and the second sealing jaw 104 during operation. The second sealing jaw 104 acts as an anvil for the inductor. Generally, energy has to be transferred from the sealing unit to the packaging material in order to generate heat and accomplish sealing, yet in some instances the application of a clamping force suffices. A cable or busbar 142 is used to transfer power to the inductor used for heating. In situations where heating is desired, inductive heating is one of several alternatives, and thus the present invention should not be construed as limited to this specific embodiment. The second sealing jaw 104 is attached to the corresponding tong 108 in such a way that the distance between the sealing jaws may be varied. In this way the arrangement may be adapted to various thicknesses of the packaging material in a simple and straightforward manner.

After loosening bolts 144 of a two part holder (or socket) 160, cylinders 146 may be slid back and forth, which effectively will alter the distance between the sealing jaws in their closed position. The cylinders 146 have a slightly more complex construction than what is obvious from FIG. 1. They offer a resilient suspension for the sealing jaw 104, and an internal variable spring arrangement (inside each cylinder 146, and referred to as first spring arrangement in the appended claims) enables a variable sealing force to be applied to a packaging material clamped between the sealing jaws. The suspension also comprises further spring arrangement 151 (called second spring arrangement in the appended claims to distinguish from the first spring arrangement) arranged to push the sealing jaw 104 away from the holder. The further spring arrangement is a separate element, and a spring 149 provides the biasing force of the further spring arrangement 151. This differs from the second embodiment, yet to be described, where the "further spring arrangement" 249 is arranged in the same element as the first spring arrangement and refers directly to the actual spring (pair of springs providing the biasing force. The force applied by the spring arrangement 151 may be varied and set to about half the desired sealing force, and the spring arrangement 151 are particularly useful when calibrating the sealing jaws, and the whole arrangement, the procedure which will be described in the following paragraph. It should be noted that only one bolt 144, cylinder 146 and further spring arrangement 151 has been given a reference numeral in FIG. 1, yet this is only to increase the readability of FIG. 1 and should not be used as an indication for the actual number of components. From FIG. 1 it is possible to deduce that there are four bolts 144, four cylinders 146 and two spring arrangements 151 in the arrangement of the present embodiment. The skilled person realizes that it is the desired function of the components that is the issue rather than the type or number of the actual components. The effect of the further spring arrangement 151 is controlled by operation of the screw 148, which will be described in more detail in relation to FIGS. 3 and 4.

The calibration of the above system is particularly simple, and it does not have to be performed in the order to be stated below even if it may be the most straightforward manner. The user simply transfers the sealing jaws to their fully closed position having the desired amount of packaging material clamped between the sealing jaws, preferably being less than the amount of packaging material located there during actual operation of the system. The arrangement may then be locked in this position, e.g. by physical locking of the cam wheel. After loosening the bolts 144 the sealing jaw 104 will be biased towards the sealing jaw 102 with about half the desired sealing force, provided by the further spring arrangement 151 (149), clamping the packaging material therebetween. At this point the bolts 144 are tightened again, and the arrangement has been calibrated. In some embodiments the biasing force of the spring arrangement 151 is not desired during operation, in which case they are only activated during calibration of the sealing jaws. The sealing arrangement comprises a number of joints, and each joint will result in some amount of play which will affect the tolerances. The force generated by the spring arrangement during calibration will effectively force the total play in the system towards one extreme, and in this way the tolerances of the arrangement when packaging material is clamped between the sealing jaws are minimized.

Rubber bushings may be arranged between the sealing jaw 104 and the cylinders 146 as part of the suspension. The rubber bushings may easily be designed by a suitable choice of shape and material such that they will not affect the sealing force, at least not to a significant degree, while still acting as a protective safety measure for the arrangement. If there is a jam in the sealing unit a possible effect may be that the amount of packaging material between the sealing jaws is doubled or more. The packaging material may also be shifted towards one end of the sealing jaws, causing an uneven load. Such unwanted displacement of the sealing jaws may result in failure of the sealing jaws, their suspension and undesired forces may be transferred through the arrangement and cause failure of the whole arrangement. The rubber bushings will absorb the forces and displacement within foreseeable limits, which will spare integrity of the arrangement.

Figure 3:
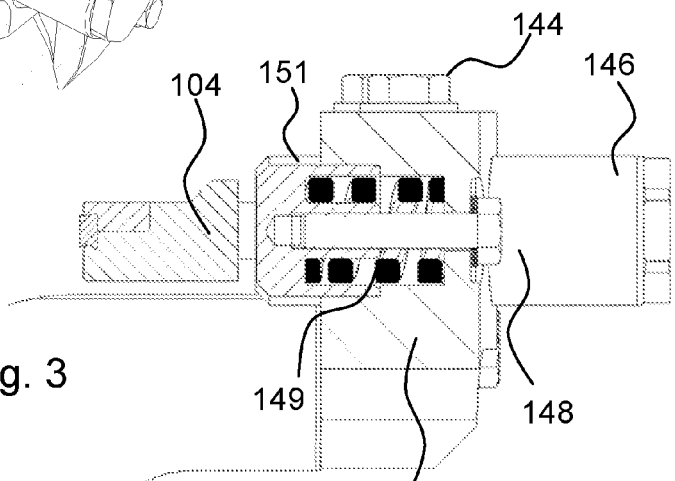
FIGS. 3 and 4 are sectional views of a sealing-jaw suspension according to a first embodiment.
Figure 4:
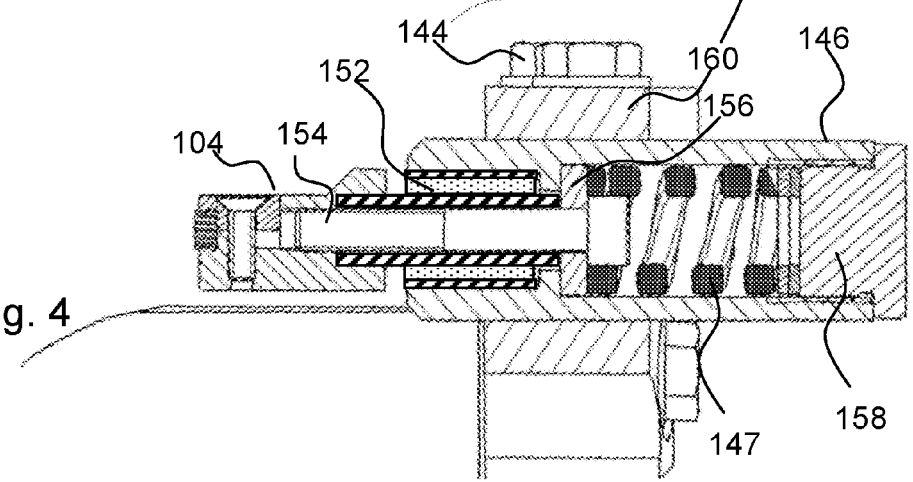

The first embodiment is further illustrated in the detailed views of FIGS. 3 and 4. FIG. 3 illustrates a section of the further spring arrangement 151 and FIG. 4 illustrates a section of the cylinder 146. As illustrated, there is included a screw 154, a resilient buffer 152, and a spring 147 of the first spring arrangement arranged between a washer 156 and an end member 158. There, an element providing the effect of the main spring (used during operation of the device) is located in the cylinders 146, which may have a construction being basically identical to the one that will be described in relation to the second embodiment, but for a disc-spring means present in the second embodiment. The action of the disc spring is however instead provided by an additional, separate spring housing, i.e. the "further spring arrangement" 151, the function of which in the present embodiment is provided by coils springs 149. The disc spring in the embodiment of FIGS. 5 and 6 and the coil spring 149 have that in common that they are configured to try to bias the jaw 104/204 beyond the position in which it abuts its opposing jaw 102/202 when the cylinder 146/spring housing 246 is released from its shoe or socket 160/260, such that an actual biasing force will be applied. The further spring arrangement 151 may be provided with a disc springs instead of the coil spring 149, yet any other suitable biasing arrangements may be applied. In this first embodiment the coil spring 149 is arranged in an opening of the socket 160, one end of the spring abutting the bottom of the opening (remote to the sealing jaw). The other end of the coil spring is arranged in an abutment element (see the element at reference numeral 149), which in turn is connectable to a screw 148. The screw threadingly engages the abutment element and extends concentrically with the coil spring 149 and through a hole in the bottom of the opening to the remote end of the socket 160, where the screw head is located. By operating the screw 148 the coil spring may be compressed (and pulled out of contact with the sealing jaw) or released (such that it applies a biasing force onto the sealing jaw).

In the embodiment of FIGS. 3 and 4 (and 1 and 2) a method of calibrating the sealing jaws by means of the suspension may comprise the steps of Loosen screw 144, which will allow the main spring cylinder 146 to slide in its socket.

Set cam in sealing position with a shim or one layer of carton between sealing jaw and the dolly.

Loosen screw 148 which will allow the further spring arrangement 151 (149) to bias the sealing jaw in a closing direction with a force determined by the properties of the coils spring 149.

Tighten screw 144, such as to lock the main spring cylinder 146 in its socket.

Tighten screw 148, which will retract the further spring arrangement 151 (149) such that its biasing effect is discontinued.

In use it is common to utilize the forming and sealing unit to operate at two or more packaging containers simultaneously. In such a case the sealing jaw 104 may be divided cross its longitudinal direction such that it comprises two or more segments. This may be utilized in such a way that each packaging container being formed and sealed using the inventive system will be handled by an individual segment. In this way one segment will not be affected if there is an anomaly at the other segment. Examples of anomalies include the absence of a packaging container, an unexpected thickness of the material, etc. The effect on the inventive suspension is that two or more duplicate suspension arrangements have to be used, preferably two per segment of the sealing jaw. In an alternative embodiment two main springs are used for each segment, yet only one further spring arrangement according to any previous or subsequent description. The most common arrangement is however that the two types of biasing arrangements come in pairs.

Figure 5:
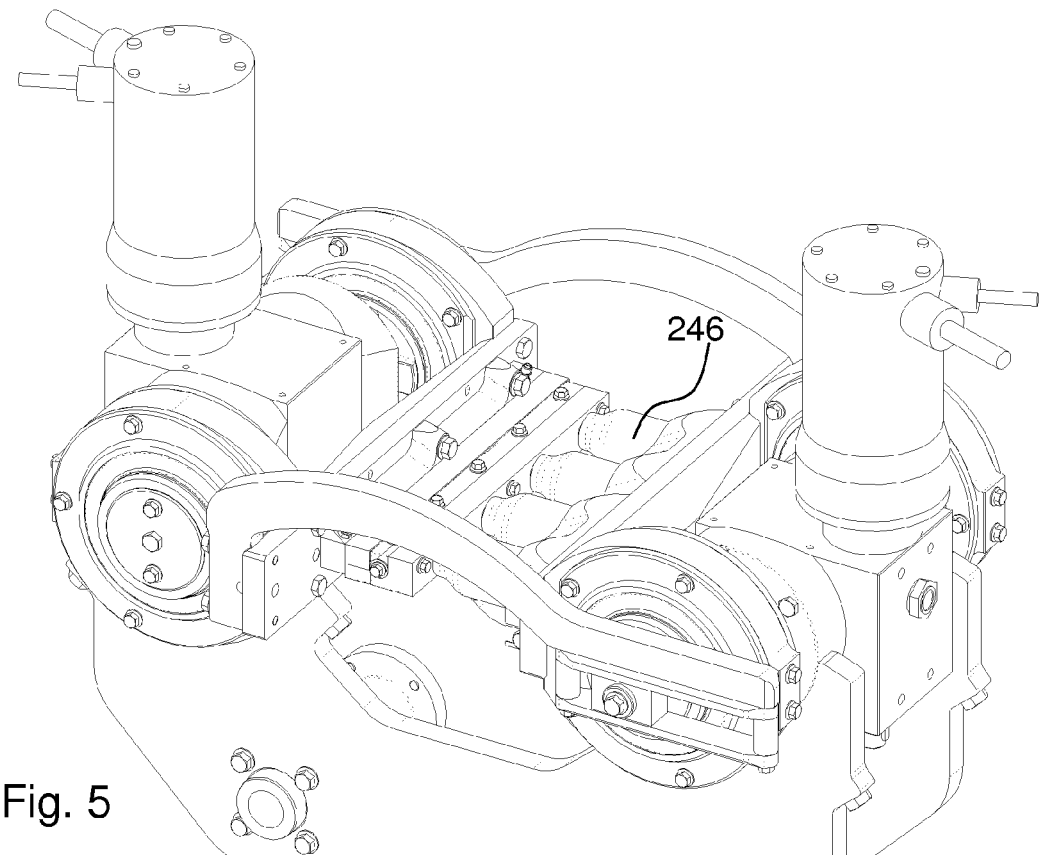
FIG. 5 is a perspective view of a form and sealing unit comprising a suspension according to a second embodiment of the present invention.
Figure 6:
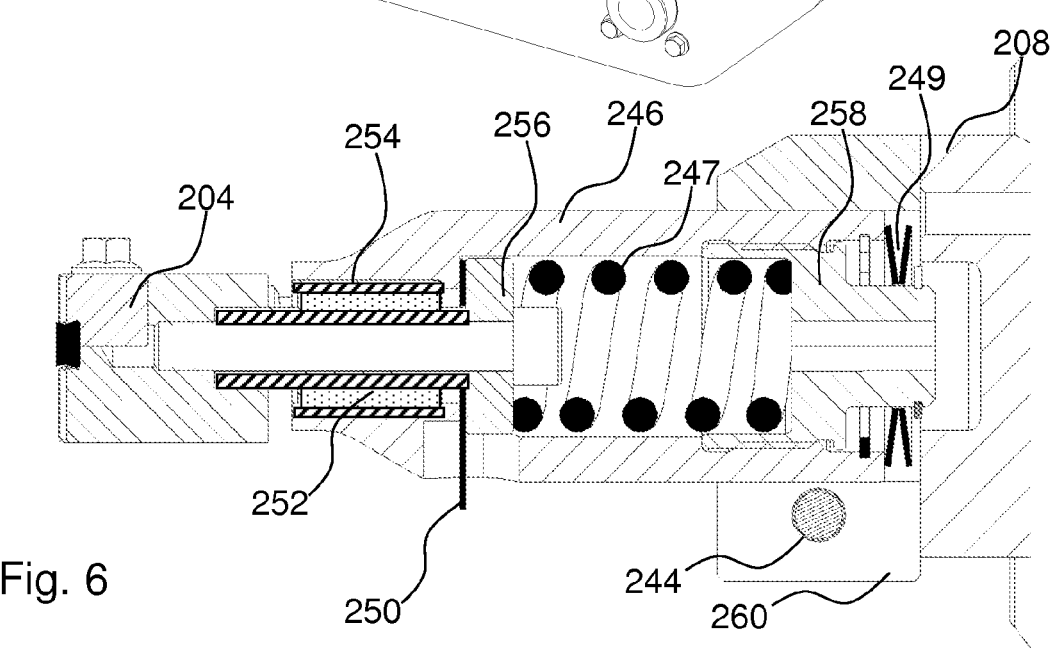
FIG. 6 is a sectional view of a sealing-jaw suspension according to the second embodiment.

A second embodiment of the present invention is illustrated in FIGS. 5 and 6, and the drawing of FIG. 5 is collected from a copending application with application number SE1000902-5, in which details of that particular system is disclosed and to which reference is made for better understanding. Details directly related to the present embodiment are described below. Suspension carries a sealing jaw 204 in the distal end, which connects to a spring housing 246 via a rubber bushing 252 and a jaw piston 254, running through the rubber bushing 252, proximally of the sealing jaw 204. The spring housing 246 encloses a main spring 247, which is stressed inside the spring housing, by a distal plate 256 and a proximal plug 258. Proximally, the spring housing 246 is attached to a driven arm 208 by a shoe 260. In between the spring housing 246 and the arm 208, i.e. in between the plug 258 and the arm 208, held by the shoe 260, a disc spring 249 is located. Thus, the disc spring 249 is positioned proximally of the plug 258 and distally of the arm 208. By tightening/loosening the shoe 260, by tightening/loosening the screw 244, the disc spring 249 will be able to bias the spring housing 246 in a sealing direction (to the left as illustrated in FIG. 6). The rubber bushing is in the illustrated embodiments comprised of rubber vulcanized between two metal cylinders, which may be seen in FIG. 6.

Thus, when the shoe 260 is in a relaxed position the disc spring 249 is in a released state, and the spring housing 246 is displaceable proximodistally within the shoe 260. Simultaneously, the main spring 247 is prestressed within the spring housing 246, in between the plate 256 and the plug 258. In this position, a shim or a layer of carton may be put in between the sealing jaw 204 and a corresponding sealing jaw.

The sealing jaws are then brought into contact in a clamping position. In this position, the main spring 247 is not affected to the extent that it will be compressed, while the spring housing 246 will be in correct sealing position with respect to the sealing jaw 204. The disc spring 249 is now compressed, and the shoe 260 is fixed with relation to the spring housing 246 by for example tightening a screw member 244. In this step the first spring arrangement, the main spring 244, is engaged while the second spring arrangement, the disc spring 249 is disengaged since the housing will be positionally locked in relation to the socket 260. In the particular embodiment of FIG. 6 the spring force provided by the disc spring 249 is lower than the spring force provided by the main spring 247 explaining why the main spring is not affected. This is true as long as the stroke of the housing 246 remains within the active stroke of the disc spring 249. As soon as the disc spring 249 is fully compressed or if the housing 246 is engaged with—i.e. locked in positional relationship with—the shoe 260 any further compression will activate the main spring 247. This relationship does not have to be true for the first embodiment, yet in most cases, however, it is preferred that the relationship that the effective spring constant of the first spring exceeds the spring constant of the second spring still prevails.

When sealing two layers of carton, during use, the spring housing 246 will be fixedly arranged in the shoe, and the disc spring 249 is not affected. Thus, instead the main spring 247 will be stressed when the jaw piston 254, running through the rubber bushing 252, pushes on the plate 256. In this state, a washer 250 will be released, which washer was clamped in between the spring housing 246 and the plate 256. In this way, by pushing the washer 250, the user may control if the main spring 247 has been affected, and thus if correct sealing position has been obtained. If the main spring 247 is compressed ever so slightly, it will disengage from the washer 250, whereby a handle portion of the washer 250 extending out from the spring housing 246 will become loose to the touch. So, if the washer 250 is loosely arranged the main spring 247 has been compressed, which in turn means that the correct sealing force is applied. Even if the washer 250 provides a convenient control parameter it should not be considered an essential feature of the present invention.

The spring force provided by the disc spring 249 may be balanced to provide about half the force needed during clamping.

There are numerous applications for the present embodiment, one being for the system disclosed in the copending application with application number SE1000902-5, where it may be used to suspend the sealing jaw 102 (reference numeral as used in FIGS. 1 and 2 of the cited application).

The invention claimed is:

1. A sealing unit comprising a sealing jaw suspended in a socket via a suspension comprising a first spring arrangement and a second spring arrangement for selectively biasing the sealing jaw in a sealing direction, the suspension comprising
    a first state in which the first spring arrangement is rigidly attached to the socket and operable to apply a first biasing force onto the sealing jaw in the sealing direction while the second spring arrangement is prevented from applying a second biasing force onto the sealing jaw, and
    a second state in which the first spring arrangement is movably arranged to the socket so that the first biasing force of the first spring arrangement is not applied to the sealing jaw and the second spring arrangement is arranged to apply the second biasing force onto the sealing jaw in the sealing direction.

2. The sealing unit of claim 1, wherein the first spring arrangement comprises a first housing in which a first spring is arranged, the housing having an open end in the direction of the sealing jaw.

3. The sealing unit of claim 2, wherein the housing is arranged in a matching opening of the socket.

4. The sealing unit of claim 1, wherein a resilient buffer is arranged between a spring of the first spring arrangement and the sealing jaw, the resilient buffer having a through hole in the biasing direction.

5. The sealing unit of claim 1, wherein the second spring arrangement comprises a second housing arranged in a matching opening of the socket.

6. The sealing unit of claim 1, wherein an effective spring constant for the first spring arrangement exceeds an effective spring constant for the second spring arrangement.

7. The sealing unit of claim 1, wherein the sealing jaw is divided in a length direction.

8. The sealing unit of claim 1, wherein a washer is arranged between a spring of the first spring arrangement and a distal end of a housing containing the spring.

9. A method for calibrating opposing sealing jaws, wherein at least one of the sealing jaws are provided with a suspension according to claim 1, the method comprising:
    bringing the opposing sealing jaws to a fully closed position,
    disengaging the first spring arrangement such that the sealing jaws are biased towards each other by a force provided by a second spring arrangement only,
    engaging the first spring arrangement.

10. The method of claim 9, wherein the disengagement/engagement of the first spring arrangement may be effected by disengaging/engaging its coupling to the socket.

11. The method of claim 9, further comprising the steps of engaging and disengaging the second spring arrangement, wherein the step of disengaging the second spring arrangement is effected after the step of engaging the first spring arrangement.

12. A sealing unit comprising:
    a socket;
    a sealing jaw suspended in the socket by a suspension and movable toward an opposing sealing jaw to clamp and seal packaging material, the suspension being operable in a first state and a second state, the suspension comprising a first spring arrangement and a second spring arrangement;
    the first spring arrangement being fixed in position relative to the socket in the first state of the suspension to apply a first spring biasing force to the sealing jaw that biases the sealing jaw in a sealing direction toward the opposing sealing jaw while the packaging material is positioned between the sealing jaw and the opposing sealing jaw to seal the packaging material during a sealing operation;
    the first spring arrangement not applying the first spring biasing force to the sealing jaw in the second state of the suspension occurring during a calibration operation in which the second spring arrangement applies a second spring biasing force to the sealing jaw that biases the sealing jaw in the sealing direction toward the opposing sealing jaw; and
    the second spring arrangement being prevented from applying any biasing force to the sealing jaw in the first state of the suspension during the sealing operation.

13. The sealing unit of claim 12, wherein the first spring arrangement comprises a first spring positioned in a first housing, the housing including an open end that is open in a direction toward the sealing jaw.

14. The sealing unit of claim 12, wherein the second spring arrangement comprises a second housing arranged in an opening of the socket.

15. The sealing unit of claim 12, wherein the first spring arrangement and the second spring arrangement both possesses an effective spring constant, the effective spring constant of the first spring arrangement exceeding the effective spring constant of the second spring arrangement.

16. The sealing unit of claim 12, wherein the sealing jaw is divided in a lengthwise direction.

17. The sealing unit of claim 12, wherein the first spring arrangement comprises a first spring positioned in a first housing, and further comprising a washer arranged between the first spring and a distal end of the first housing.

* * * * *